United States Patent [19]
Ruman

[11] Patent Number: 5,836,851
[45] Date of Patent: Nov. 17, 1998

[54] ENGINE CONTROL STRATEGY AS A FUNCTION OF GEAR SELECTOR MECHANISM

[75] Inventor: Mark A. Ruman, Fond du Lac, Wis.

[73] Assignee: Brunswick Corporation, Lake Forest, Ill.

[21] Appl. No.: 898,693

[22] Filed: Jul. 22, 1997

[51] Int. Cl.$^6$ .................................................. B60K 41/06
[52] U.S. Cl. .............................. 477/107; 477/115; 701/54
[58] Field of Search .................................. 477/107, 109, 477/110, 111, 115, 121; 701/51, 54, 102, 104

[56] References Cited

U.S. PATENT DOCUMENTS

| | | | |
|---|---|---|---|
| 4,703,304 | 10/1987 | Muguruma et al. | 477/107 X |
| 5,146,891 | 9/1992 | Nakazawa et al. | 477/107 X |
| 5,323,667 | 6/1994 | Tweed et al. | 701/54 X |
| 5,389,051 | 2/1995 | Hirate et al. | 701/54 X |
| 5,470,287 | 11/1995 | Fujimoto | 477/107 X |
| 5,583,766 | 12/1996 | Birchenough et al. | 701/54 X |
| 5,638,271 | 6/1997 | White et al. | 477/107 X |
| 5,676,620 | 10/1997 | Ulm et al. | 477/115 |
| 5,788,602 | 8/1998 | Pennese et al. | 477/107 |

*Primary Examiner*—Dirk Wright
*Assistant Examiner*—Peter T. Kwon
*Attorney, Agent, or Firm*—William D. Lanyi

[57] ABSTRACT

An engine control system is provided with two sets of gain factors for use in conjunction with a PID control system. When a gear selection mechanism is in a steady state, a first set of gain factors is used so that the engine control system is less responsive and the engine operates more smoothly. When the gear selection mechanism is being moved from a neutral position to either forward or reverse gear or vice versa, a second set of gain factors are substituted for the first set so that the engine control system will be more responsive and the sudden change in the load on the engine will not cause a stall condition or a sudden increase in the RPM. This technique can typically be employed in a proportional, integral, and differential (PID) control system, but alternative control systems can also benefit from its use.

18 Claims, 3 Drawing Sheets

ENGINE CONTROL STRATEGY AS A FUNCTION OF GEAR SELECTOR MECHANISM

BACKGROUND OF THE INVENTION

1. Field of the Invention

The present invention is generally related to an engine control strategy for an internal combustion engine and, more particularly, to a control strategy that selects the gain factors for use in a PID control scheme based on the position or change of position of a gear selector mechanism.

2. Description of the Prior Art

Internal combustion engines, such as outboard motors for marine applications, which utilize engine control units (ECU's) typically employ control strategies based on a PID scheme which utilizes proportional, integral and derivative feedback. These three types of feedbacks can each have an individual gain factor. When the feedback control signal is made to be linearly proportional to the error between a desired output and an actual output, those skilled in the art refer to this type of feedback as a proportional feedback. The feedback control signal is typically calculated by multiplying a proportional feedback gain factor $K_p$ by the calculated error between the desired output and the measured output. Integral feedback, on the other hand, is determined by multiplying the sum of individual errors over a preselected time period by the ratio of the proportional gain factor $K_p$ and then dividing it by an integral time $T_I$. The inverse of the integral time is referred to as the reset rate by those skilled in the art. This type of integral feedback has the primary virtue that it can provide a finite value of feedback with no error signal input. This results from the fact that the feedback is a function of past values of the error rather than of the current value, as in the case of proportional feedback. Therefore, task errors will accumulate in the integrator to some value that will remain, even if the error becomes zero. Derivative feedback is determined by multiplying the calculated error by the proportional gain factor $K_p$ and by a derivative time $T_D$. This type of feedback is typically used in conjunction with proportional and integral feedback in order to increase the damping and generally to improve the stability of the controlled system. When the control system utilizes proportional, integral, and derivative feedback, it is referred to as a PID control by those skilled in the art. The combination of proportional, integral, and derivative feedback is often used to provide an acceptable degree of error reduction simultaneously with acceptable stability and damping characteristics. Commercially available process control systems typically have this type of combined feedback and those skilled in the art merely have to adjust the three constants, $K_p$, $T_I$ and $T_D$. Increasing the reciprocal of $T_I$ reduces stability and increasing $T_D$ improves stability.

The gain factors in a PID control system can be changed to affect the responsiveness of the control system. Increased responsiveness can be highly advantageous in certain circumstances. However, in other circumstances, increased responsiveness can be detrimental. For example, when the gear set of an outboard motor is shifted from neutral to either reverse or forward gear, it is beneficial if the engine control system is highly responsive and effectively maintains a predetermined engine speed when the throttle is at an idle position. Otherwise, the suddenly increased load on the engine, as a result of the shift out of neutral, can result in a stall condition. Therefore, when an operator of a boat is shifting the gear set from neutral into either reverse or forward gear, it is highly desirable to control the speed of the engine in a highly responsive manner as long as the throttle is still at idle speed. Naturally, when the throttle is moved from idle speed to an increased speed selection, the engine control system acts as a open loop system with the operator determining the flow rate of fuel to the engine by selecting the power output.

Throughout the description of the preferred embodiment of the present invention, the present invention will be described in terms of the position of the gear selector. It should be understood that the present invention, in a preferred embodiment, is responsive to a change in the status of the gear selector and not only in the particular gear which is selected. For example, the present invention will respond to a change of the gear selector from neutral to forward or reverse gears. When this change in status occurs, certain changes are provided in the selected gain factors. However, if the gear selector then remains in forward or reverse gear for a prolonged period of time, the selection of gain factors reverts back to the gain factor used when the gear selector was in neutral. Typically, the present invention would monitor the gear selector and respond to a change in status, from neutral to either forward or reverse, and utilize a set of gain factors which is different than those used when the gear selector was in neutral. However, after a preselected period of time has passed since the status change from neutral to forward or reverse, the gain factor selection would revert back to those used initially while the gear selector was in neutral.

If the engine control system is provided with a set of gain factors for a highly responsive strategy, the engine may behave in an undesirable manner when the boat is operated under steady load conditions and the throttle is in idle position. When in these positions, a highly responsive control strategy can overreact to an intermittent miss in certain cylinders of the internal combustion engine if the gain factors are selected to provide a highly responsive control strategy. In effect, an intermittent miss or partial combustion event will cause the engine control system to overreact and to rapidly increase fuel to the engine. This, in turn, will result in a temporary overspeed condition that will cause the highly responsive control strategy to then quickly decrease the flow of fuel to the engine. Therefore, every time a cylinder experiences an intermittent miss, an overreaction in fuel flow is caused by the engine control system and this overreaction is then followed by a subsequent compensation. If, on the other hand, gain factors are selected to result in less responsive control strategies, a shift from neutral into either forward or reverse gear can cause the engine to lag and possibly stall upon the sudden increase in load. On the other hand, a shift from forward or reverse gear to neutral can result in a sudden increase in RPM if the gain factors are not sufficiently responsive to react to the sudden decrease in load on the engine. This is sometimes referred to as a RPM flare.

It would therefore be significantly beneficial if an engine control strategy could be developed that anticipates a shift from neutral to either forward or reverse gear and, when the throttle is at idle speed, implement a more responsive gain factor immediately prior to the shifting of the gears from neutral to either forward or reverse or, alternatively, immediately prior to shifting the gears from either forward or reverse into neutral. It would also be significantly beneficial if an engine control strategy would implement a less responsive gain factor when the throttle is in idle position and the gear selector mechanism is in a gear position for prolonged period of time which is considered by the present invention to be a steady state condition of the gear selector. This less responsive gain factor would decrease the amount of reaction by the engine control system and would result in smoother running of the engine when in neutral and at idle speed.

SUMMARY OF THE INVENTION

A preferred embodiment of the present invention incorporates an engine control system comprising a gear selection mechanism and an engine control device having a first input signal representative of a position of the gear selection mechanism. The engine control device also has a second input that is representative of the actual speed of the engine. This second input can possibly be provided with a signal from a sensor that senses the rotational speed of a flywheel of the engine. The present invention further comprises an engine speed controller connected in signal communication with the engine control device for maintaining the speed of the engine at a selected magnitude by comparing the actual speed to the selected magnitude and affecting the fuel flow to the engine as a function of a selected gain factor and the difference between the actual speed and the selected magnitude. The present invention further comprises a means for storing a first gain factor and a means for storing a second gain factor. In addition, the preferred embodiment of the present invention comprises a means for choosing the selected gain factor from the first and second gain factors as a function of the position of the gear selection mechanism.

The preferred embodiment of the present invention can also comprise a switch connected to the gear selection mechanism for providing the first input signal to the engine control device. In addition, the system can comprise a sensor connected to the engine for providing the second input which is representative of the actual speed of the engine.

The first gain factor, in a particular preferred embodiment of the present invention, is less than the second gain factor so that it is less responsive. In addition, the first gain factor is chosen as the selected gain factor is in a neutral position. Throughout the description of the preferred embodiment of the present invention, it should be understood that the term "gain factor" can incorporate several gain values. For example, a gain factor can comprise three separate values for the proportional, integral and derivative feedback control schemes.

In a preferred embodiment of the present invention, the engine speed controller utilizes a PID control scheme when the throttle control mechanism is at idle speed.

Operation of the control system performs the method for controlling a engine which comprises determining the position of the gear selector, choosing a gain factor as a function of the position of the gear selector, determining an actual speed of the engine, determining a desired speed of the engine, calculating a difference between the actual and desired speeds, multiplying the gain factor by a function of the difference in order to determine a required correction value, and controlling a variable parameter as a function of the required correction value. The speed of the engine is dependent on the variable parameter, which can be the rate of fuel flow provided to the engine. When the gain factor is multiplied by the function of the difference between the actual speed and desired speed, the function can be the proportional relationship between the desired speed and the actual speed, the integral sum of errors between the desired speed and actual speed over a preselected period of time, or the derivative of the difference over time.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
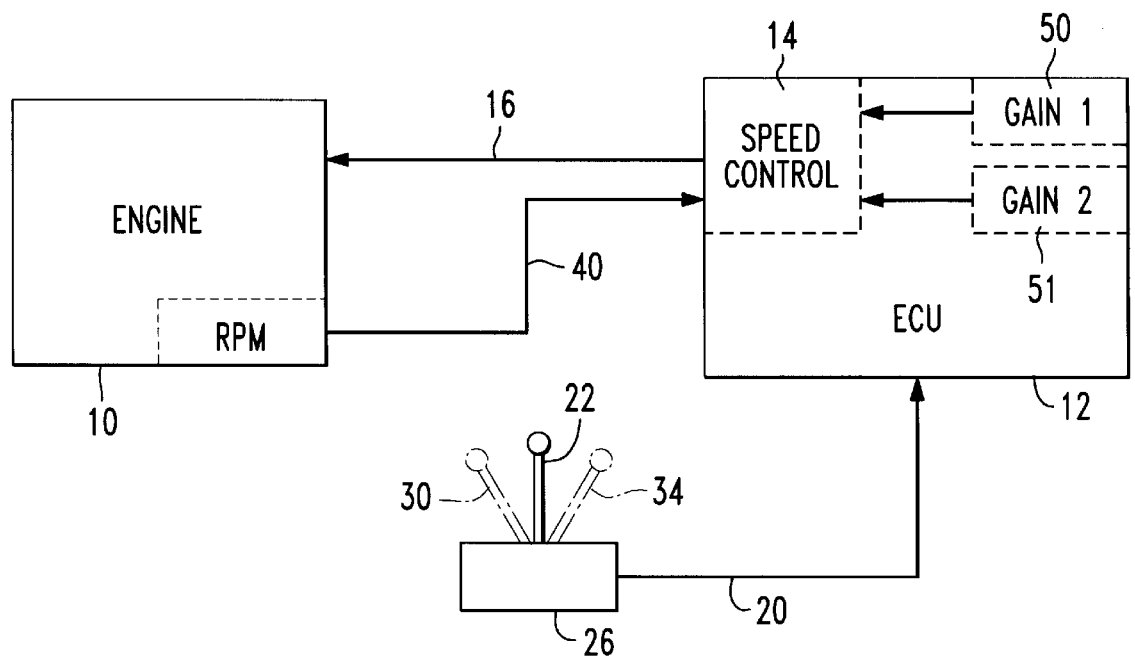
FIG. 1 is a schematic representation of an engine associated with an engine control unit made in accordance with the present invention.

Throughout the description of the preferred embodiment, like components will be identified by like reference numerals.

FIG. 1 is a highly schematic illustration of an engine 10 associated with an engine control unit, or ECU, which is identified by reference numeral 12. The engine control device is associated with an engine speed controller 14 which provides signals, on line 16, to the engine 10 for the purpose of changing the rate of fuel flow to the engine. The engine control device has a first input signal 20 that represents the position of a gear selection mechanism 22. A switch, contained in housing 26, detects the position of the gear selection mechanism 22 and provides a representative first signal 20 to the engine control unit. Three possible positions of the gear selection mechanism 22 are shown in FIG. 1. The central position represents a neutral position, the position identified by reference numeral 30 and shown in dashed outline represents a forward gear position and the position identified by reference numeral 34 represents a reverse gear position. In the preferred embodiment of the present invention, a first logic level signal will be provided as the first signal 20 when the gear selection mechanism is in a steady state for a preselected period of time and a second logic level signal would be provided as a first signal 20 when the gear selection mechanism is moved to either the forward 30 or the reverse 34 position or, alternatively, the second logic level signal would be provided as a first signal 20 when the gear selection mechanism is moved from either the forward 30 or the reverse 34 position in to the neutral. The purpose of the first signal 20 is to inform the engine control unit when the gear selection mechanism is moving either from neutral to any other gear position or from a gear position into neutral. The second input signal 40 represents the speed of the engine 10. This second signal 40 can be provided by a gear tooth sensor that monitors the passage of indicators on the flywheel of the engine. Alternatively, any other type of device, such as a tachometer, which measures engine speed can be used to provide the second input signal 40 to the engine control unit.

The control signal 16 provided by the engine control unit to regulate the speed of the engine 10 can be a signal to a fuel injector, an intake air flow control mechanism or any other device that is capable of regulating the speed of the engine 10.

Figure 2A:
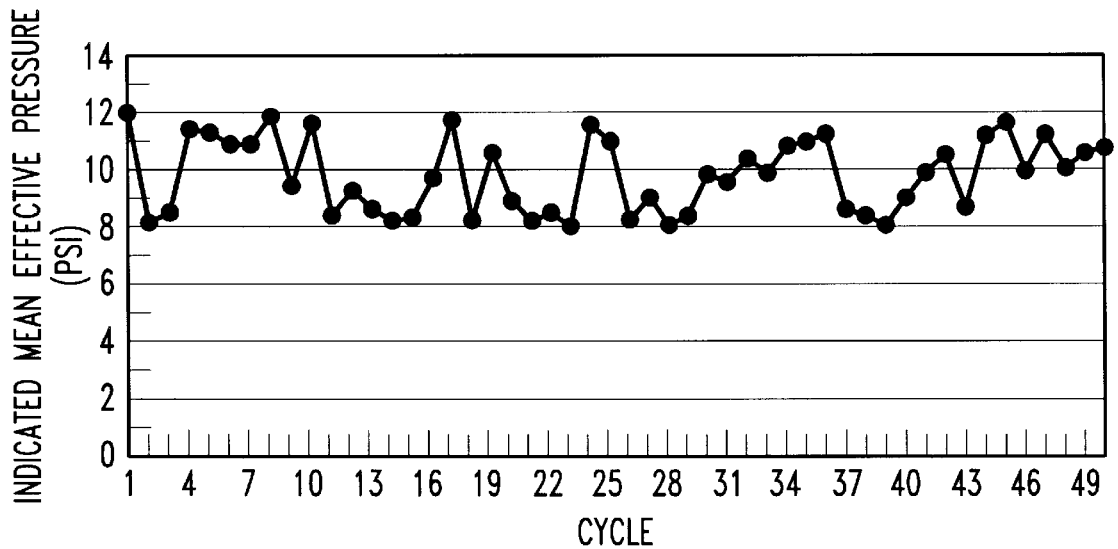
FIGS. 2A and 2B show the operation of a hypothetical cylinder of an internal combustion engine in neutral and at idle speed under two different sets of gain factors.
Figure 2B:
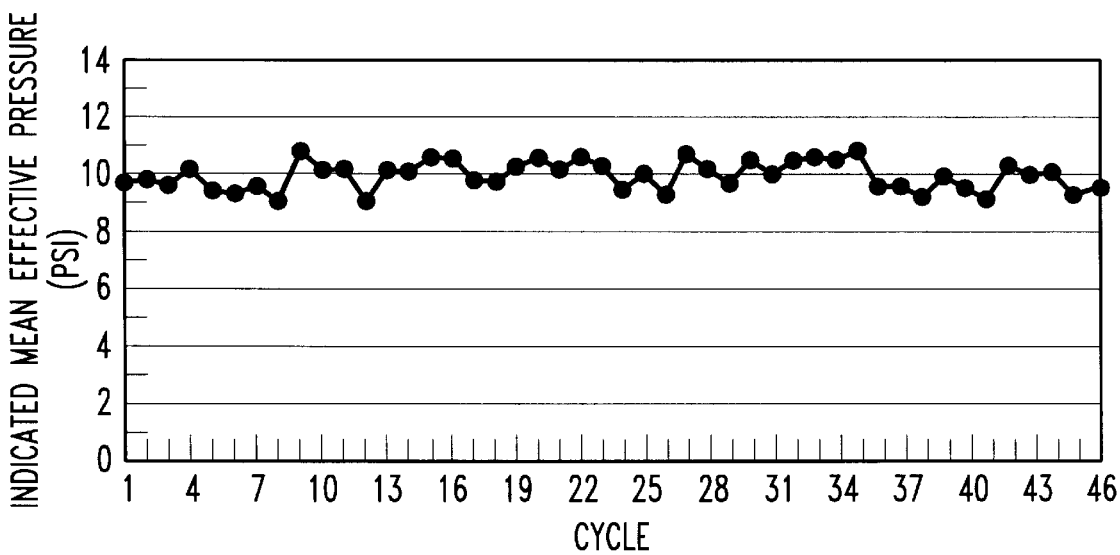

FIGS. 2A and 2B show two different behavior patterns for a hypothetical single cylinder of an internal combustion engine, measured over time. In FIG. 2A, the indicated mean effected pressure (IMEP) is shown over a plurality of combustion cycles for a particular cylinder of an internal combustion engine. As can be seen, the indicated mean effected pressure changes significantly from one cycle to the next. This is caused by an excessively high gain factor being used while the engine is at idle speed and the gear set is in neutral. The problems described above, wherein an occasional misfire causes an overreaction by the PID system and a subsequent correction, results in the variations in IMEP represented in FIG. 2A. If the gain factors of the PID system could be made less responsive, the results would be a smoother running engine at idle speed and in neutral, as represented in FIG. 2B. The mean values of the indicated mean effected pressure in both FIG. 2A and FIG. 2B are the same magnitude, but the standard deviation is significantly different. The engine cylinder represented hypothetically in FIG. 2B is running much more smoothly at idle speed, when in neutral, than the engine represented hypothetically in FIG. 2A. If the gain factors used in the PID system of the engine are changed to be less responsive, the problems indicated in FIG. 2A will be alleviated. However, as discussed above, other problems will be created by this decrease in responsiveness. When the gear selection mechanism is shifted into either forward or reverse gear, with the throttle set at idle speed, the sudden load placed on the engine could cause it to stall. Also, as described above, a sudden RPM increase can result from a shift from either forward or reverse into neutral.

Given the choice in gain factors described above and the disadvantages of either excessively responsive or significantly less responsive gain factors, accommodations are generally made in the selection of the gain factors for the PID system. These accommodations usually result in less than ideal conditions at both extremes, when the engine is at idle speed in neutral gear position and when the engine is at idle speed in either forward or reverse gear.

With reference to FIG. 1, the present invention solves this dilemma by providing two gain factors, as identified by reference numerals 50 and 51. When the gear selection mechanism is in neutral, the engine control unit selects the first gain factor for the PID system. When the gear selection mechanism is in either forward or reverse gear, the engine control unit selects the second gain factor 71. A switch associated with the gear selection mechanism 22 provides a signal 20 that allows the engine control unit to make this determination. In known types of engine control units, the engine control system is provided with a means by which it can determine the position of the throttle. When the throttle is in idle speed, a PID control system is used. When the throttle is moved out of idle speed position, the engine is run as an open loop control system in which the operator manually selects the rate of fuel flow to the engine. The present invention is not related to the operation of the engine above idle speed, but, instead, determines the appropriate gain factor when the engine throttle is at idle speed. The present invention makes this determination based on the change of the position of the gear selection mechanism.

Figure 3:
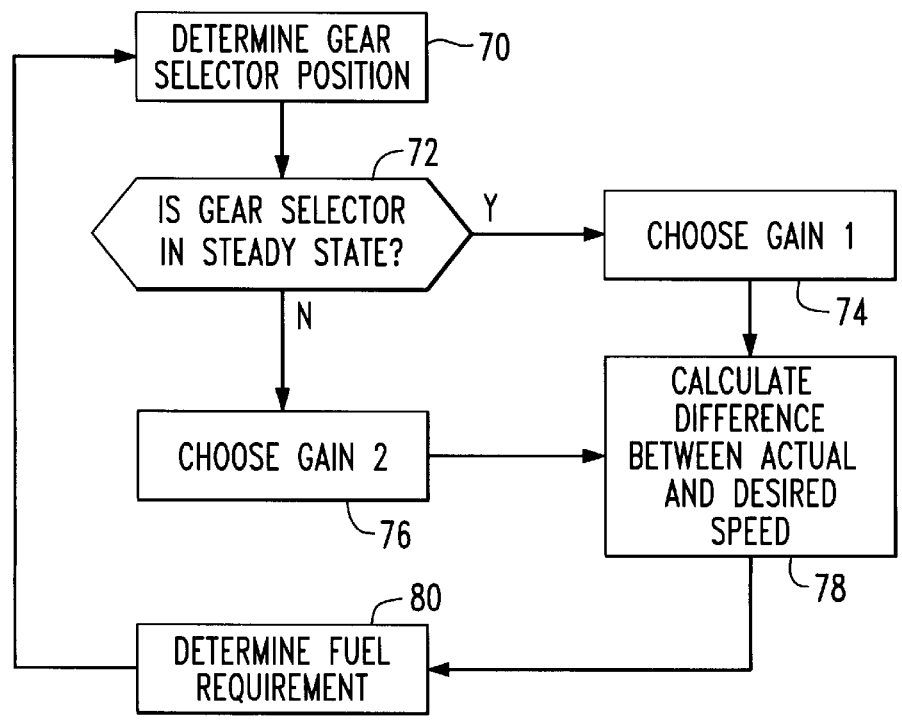
FIG. 3 is a flow chart showing the logic of the present invention.

FIG. 3 is a simplified flow chart showing the logical operation of an engine control system made in accordance with the present invention. With reference to FIGS. 1 and 3, the control system determines the gear selector 22 position, as illustrated in block 70. This determination is made by interrogating the first signal 20 provided by the gear selection mechanism. The control system then determines whether the gear selection mechanism 22 is in a steady state. This interrogation occurs at function block 72 in FIG. 3. If the gear selector is in a steady state, the first gain factor 50 is chosen at function block 74. If the gear selector is not in a steady state, but is dynamic, the second gain factor 51 is chosen at function block 76. Regardless of the gain factor selected, the engine control system then calculates the difference between the actual speed and the desired speed at function block 78. A variable which is a function of this difference is multiplied by the selected gain factor and a feedback is calculated which allows the control system to determine the fuel requirement as shown in function block 80. After the determination is made and an appropriate signal is provided on line 16 of FIG. 1 to the engine 10, the process is again repeated by the speed control device 14 of the engine control unit.

Figure 4:
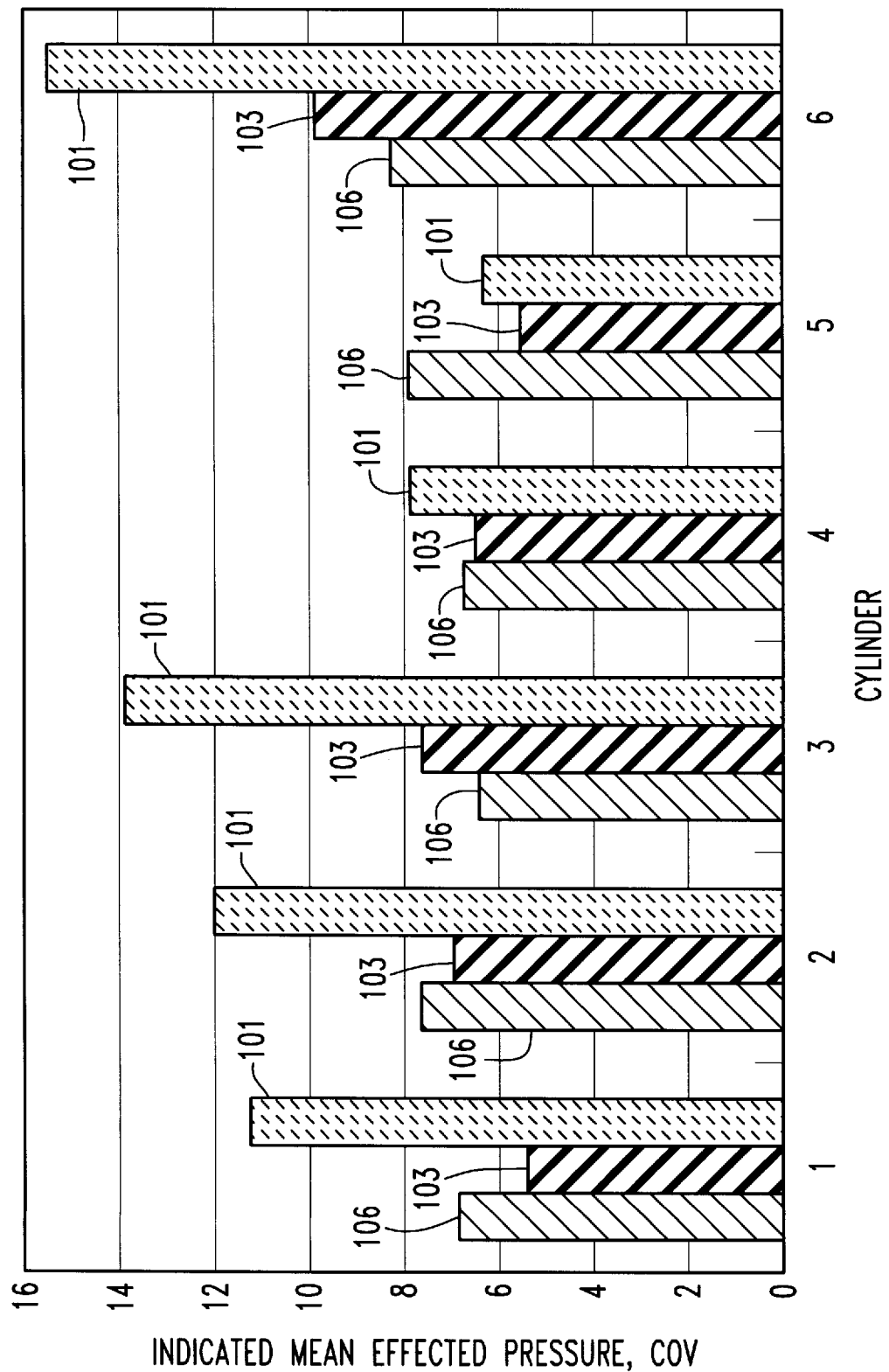
FIG. 4 shows the effects on the coefficient of variation of the indicated mean effective pressure for six cylinders under three conditions taken empirically.

In FIG. 4, the coefficient of variation (COV) for the indicated mean effected pressure (IMEP) is shown in FIG. 4 for each of six cylinders of an internal combustion engine at three different PID configurations which make up the gain set or gain factor. The $IMEP_{COV}$ represented in the rightmost bar of each three bar grouping is identified by reference numeral 101. It represents the $IMEP_{COV}$ when the standard PID gain factors are used. These gain factors, which are perfectly suitable for use when the gear selection mechanism is shifting from neutral to either reverse or forward gears or shifting from either forward or reverse gears to neutral, results in the widely varying IMEP's represented by the coefficients of variations in bars 101 in FIG. 4. Not only do the coefficients of variation differ from cylinder to cylinder, but the average of the six magnitudes is higher than desirable. The central bar 103 of each three bar grouping in FIG. 4 represents the operation of the internal combustion engine when no PID control system is used. When the engine is run at idle, it can be seen that the running of the engine exhibits a lower coefficient of variation for the indicated mean effective pressure at each of the six cylinders compared to the standard gain factors for the PID as represented by bars 101. When a modified set of gain factors for the PID is used for the engine at idle speed and in neutral, the variation, from cylinder to cylinder of the coefficient of variation is noticeably improved. These are represented by the leftmost bar 106 of each three bar grouping in FIG. 4. The data shown in FIG. 4 is empirical data taken with a 3.0 liter direct fuel injection 225 horsepower engine with the idle speed set at 550 RPM and no load on the engine. FIG. 4 illustrates that a modified set of PID gain factors can noticeably improve the operation of the engine at idle speed. This general reduction in coefficient of variation and the improvement of the consistency of the coefficients of variation from cylinder to cylinder is illustrated by bars 106. When the engine is operated at idle speed and in neutral gear position, a modified set of PID gain factors are used so that the engine control unit is less responsive under these conditions. This results in the smoother idle illustrated hypothetically in FIG. 2B. When the gear selection mechanism is being moved from neutral to either forward or reverse gear position, or vice versa, a more responsive set of PID gain factors are immediately substituted for the idle set in order to avoid the possible stall of the engine when the load is suddenly placed on it or a sudden RPM flare when the load is removed.

Although the present invention has been described with considerable detail and illustrated to show a specific embodiment, it should be understood that alternative embodiments are also within its scope. For example, the engine parameter affected by this control scheme does not have to be the rate of fuel delivery to the engine. Alternatively, other engine parameters can be changed, such as the spark advance airflow or any other operating parameters that affects the engine speed. In addition, although test results are shown for a fuel injected engine, other types of internal combustion engines can benefit from the use of the present invention. It should be understood that, although the present invention has been described as having a means for choosing the selected gain factor as a function of the position of the gear selection mechanism, it has also been explained that this terminology refers to the state of the gear selector over time. In other words, the actual position of the gear selector is not always as critical to the operation of the present invention as the fact that it has recently experienced a change in state from neutral to either forward or reverse or, alternatively, from either forward or reverse to neutral. This change in state, from neutral or into neutral, determines the actions of the present invention with regard to the changing of the gain factor. After the gear selector has been in gear or neutral for a sustained period of time greater than a preselected time period, the first gain factor is selected. However, during the preselected period of time after a change in state of the gear selector, the second gain factor is selected.

I claim:

1. An engine control system, comprising:
   a gear selection mechanism;
   an engine control device having a first input signal representative of a position of said gear selection mechanism and a second input signal representative of the actual speed of said engine;
   an engine speed controller, connected in signal communication with said engine control device, for maintaining the speed of said engine at a selected magnitude by comparing said actual speed to said selected magnitude and affecting the fuel flow to said engine as a function of a selected gain factor and the difference between said actual speed and said selected magnitude;
   means, connected in signal communication with said engine speed controller, for storing a first gain factor;
   means, connected in signal communication with said engine speed controller, for storing a second gain factor; and
   means, connected in signal communication with said engine speed controller, for choosing said selected gain factor from said first and second gain factors as a function of a change of said position of said gear selection mechanism.
2. The system of claim 1, further comprising:
   a switch connected to said gear selection mechanism, said switch providing said first input signal to said engine control device.
3. The system of claim 1, further comprising:
   a sensor connected to said engine, said sensor providing said second input signal representative of the actual speed of said engine to said engine control device.
4. The system of claim 1, wherein:
   said first gain factor is less than said second gain factor.
5. The system of claim 4, wherein:
   said first gain factor is chosen as said selected gain factor when said gear selection mechanism remains unchanged for a preselected period of time.
6. The system of claim 1, wherein:
   said engine speed controller uses a PID control scheme when a throttle control mechanism is at idle speed.
7. An engine control system, comprising:
   a gear selection mechanism;
   an engine control device having a first input signal representative of a position of said gear selection mechanism and a second input signal representative of the actual speed of said engine;
   a switch connected to said gear selection mechanism, said switch providing said first input signal to said engine control device;
   an engine speed controller, connected in signal communication with said engine control device, for maintaining the speed of said engine at a selected magnitude by comparing said actual speed to said selected magnitude and affecting the fuel flow to said engine as a function of a selected gain factor and the difference between said actual speed and said selected magnitude;
   means, connected in signal communication with said engine speed controller, for storing a first gain factor;
   means, connected in signal communication with said engine speed controller, for storing a second gain factor; and
   means, connected in signal communication with said engine speed controller, for choosing said selected gain factor from said first and second gain factors as a function of said position of said gear selection mechanism.
8. The system of claim 7, further comprising:
   a sensor connected to said engine, said sensor providing said second input signal representative of the actual speed of said engine to said engine control device.
9. The system of claim 7, wherein:
   said first gain factor is less than said second gain factor.
10. The system of claim 9, wherein:
    said first gain factor is chosen as said selected gain factor when said gear selection mechanism remains unchanged for a preselected period of time.
11. The system of claim 7, wherein:
    said engine speed controller uses a PID control scheme when a throttle control mechanism is at idle speed.
12. A method for controlling an engine, comprising:
    determining the position of a gear selector;
    choosing a gain factor as a function of said position of said gear selector;
    determining an actual speed of said engine;
    determining a desired speed of said engine;
    calculating a difference between said actual and desired speeds;
    multiplying said gain factor by a function of said difference to determine a required correction value; and
    controlling a fuel flow to said engine as a function of said required correction value.
13. The method of claim 12, wherein:
    said position determining step is accomplished by providing a signal from a switch which is connected to said gear selector.
14. The method of claim 12, wherein:
    said gain factor choosing step comprises the step of selecting a first gain factor when said gear selector is in a steady state condition and a second gain factor when said gear selector is changed, said first gain factor being less than said second gain factor.
15. The method of claim 12, wherein:
    said fuel flow controlling step utilizes a PID control strategy.
16. A method for controlling an engine, comprising:
    determining the position of a gear selector;
    choosing a gain factor as a function of said position of said gear selector;
    determining an actual speed of said engine;
    determining a desired speed of said engine;
    calculating a difference between said actual and desired speeds;
    multiplying said gain factor by a function of said difference to determine a required correction value; and controlling a variable parameter as a function of said required correction value, the speed of said engine being dependent on said variable parameter.

17. The method of claim 16, wherein:

said variable parameter is the fuel flow to said engine.

18. The method of claim 16, wherein:

said variable parameter controlling step incorporates a PID control strategy.

* * * * *